US00RE35468E

United States Patent [19]

Newman

[11] E Patent Number: Re. 35,468

[45] Reissued Date of Patent: Mar. 4, 1997

[54] PATIENT TRANSFER DEVICE

[76] Inventor: William C. Newman, 403 Whitaker Dr., Missoula, Mont. 59803

[21] Appl. No.: 492,254

[22] Filed: Jun. 22, 1995

Related U.S. Patent Documents

Reissue of:

[64] Patent No.: 5,271,110
Issued: Dec. 21, 1993
Appl. No.: 63,645
Filed: May 20, 1993

[51] Int. Cl.[6] ..... A61G 7/10; A61G 7/05

[52] U.S. Cl. ..... 5/81.1 R; 5/625

[58] Field of Search ..... 5/81.1, 658, 625, 5/81.1 T, 81.1 HS

[56] References Cited

U.S. PATENT DOCUMENTS

| | | | |
|---|---|---|---|
| 4,012,799 | 3/1977 | Rutherford | 5/81.1 |
| 4,361,918 | 12/1982 | Roisaeth | 5/81.1 |
| 4,744,115 | 5/1988 | Marchione | 5/81.1 |
| 4,793,008 | 12/1988 | Johansson | 5/81.1 |
| 4,908,889 | 3/1990 | Lonardo | 5/81.1 |
| 5,148,558 | 9/1992 | Dunn | 5/81.1 |
| 5,155,874 | 10/1992 | Kershaw | 5/81.1 |

*Primary Examiner*—Alexander Grosz
*Attorney, Agent, or Firm*—Harry M. Cross, Jr.

[57] ABSTRACT

The transfer device of this invention comprises a sled means 10 and a handle means 12. The sled means 10 comprises a generally rectangular, relatively thin and flat-surfaced transfer board 20. Transfer board 20 has two parallel sides and two transverse ends. Each side is provided with a plurality of loops 22 which conjoin with mating fasteners 24 of the handle means. Loops may be spaced equidistantly from the transverse ends along the sides of the transfer board 20. Handle means 12 comprises a grip bar 26, a tension bar 28, a plurality of fastener means 24, and a plurality of straps 30 which are attached to the grip and tension bars as shown.

15 Claims, 6 Drawing Sheets

PATIENT TRANSFER DEVICE

Matter enclosed in heavy brackets [ ] appears in the original patent but forms no part of this reissue specification; matter printed in italics indicates the additions made by reissue.

FIELD OF THE INVENTION

This invention relates to devices for moving human bodies from one flat surface to another, and particularly relates to such devices intended to be used to transfer reclining human patients from a bed to a gurney, from a gurney to an examining table, or from a gurney to a bed, with the patient lying flat during the transfer.

BACKGROUND OF THE INVENTION

Hospital wards and emergency rooms, medical clinics, and nursing homes all have occasion for transferring a reclining patient from one flat surface to another. Typical instances of patient transfer include transfer from a bed to a gurney, from a gurney to an examining table, and from a gurney to a bed. Such transfers have been assisted by the provision of a thin, smooth, flat polyethylene transfer board which can be slid beneath a patient and then pulled from one flat surface to the other. Typically, such transfer boards are provided in a width approximating the width of a typical patient and with hand holes suitable for gripping when pulling the patient-loaded board from one flat surface to another.

In making a transfer from a bed to a gurney, by way of example, nursing staff must align the two flat surfaces side-by-side (bed and gurney), stand adjacent to the gurney, reach across the gurney and grip the patient-loaded board through the hand holes on the board, and pull the board off of the bed and across the gurney surface until the board is centered on the gurney. The person pulling the transfer board must lean over the gurney to initially reach the board and thereby exposes his/her back to excessive strain; a position of both poor posture and severe mechanical disadvantage for performing the task safely. The person pulling the transfer board risks injury to his/her neck and shoulders as well as to the back when pulling in a forwardly bent and off-balance position such as this.

In an attempt to alleviate the arm, shoulder and back strain on a worker performing this type of transfer, it has been proposed that straps be looped through the transfer board hand holes to minimize the reach when transferring patients. However, using such strap loops, places the worker in a relatively weak pulling posture in that when the loaded sled is being pulled and moves closer to the worker, there is not chance for the worker to adjust the length of the loop for maximum leverage in completing the transfer. (The overal distance that the sled must move is greater than the average length of the human arm, so one full length pull would result in the worker's arms being at the end of the pull, but the transfer requires more than a full length pull.) Use of such strap loops, also causes the worker to grip the loops and requires the worker to pull with both arms absolutely uniformly to balance the forces between the worker's arms. Typically, the worker will not pull in a balanced manner with the result that one arm/shoulder or the other bears a greater portion of the pulling load to insure that the patient-loaded board is transferred evenly onto the target surface.

SUMMARY OF THE INVENTION

It is an object of the patient transfer device of this invention to provide a means whereby a human body may be slid from one surface to another while allowing the worker to maintain proper and safer body mechanics while performing this type of transfer. It is another object of this invention to provide such a transfer device that enables a worker to employ a palms-up or palms-down power grip using a cylinder grasp in which the thumb is used and the entire hand wraps around a firm object being pulled on. It is another object of this invention to provide the worker with an efficient method of adjusting leverage over pulling the loaded thransfer device. It is still another object of this invention to provide a pulling interface between a transfer sled and a worker that will balance the pulling forces on the sled even if the worker does not pull from the most desirable location relative to the sled.

A transfer device for a human body, according to the present invention, comprises sled means and detachable handle means wherein said sled means comprises a transfer board adapted to receive a human body, the transport board having two sides and two transverse ends, and a plurality of fastener means mounted to the transfer board along the sides thereof. The handle means comprises an elongated grip bar, and an elongated tension bar, a plurality of strap means connecting the grip bar and the tension bar whereby the relative distance between the grip bar and the tension bar may be adjusted, and a plurality of fastener means mounted to the tension bar and so constructed and arranged as to be conjoinable with the transfer board fastener means on at least one side of the transfer board. The grip bar, and preferably the tension bar, is fabricated of a relatively flexible material whereby pulling force exerted by a worker using the transfer device will be dissipated from the worker's arm and shoulders. The strap means are preferably wrapped around the grip bar and the tension bar and fastened thereto, and the handle means fasteners means are preferably mounted by the strap means and oriented outward from said handle means for interfitting with the transfer board fastener means. The transfer board preferably comprises a bottom surface material fabricated of a sheet of plastic and a foam plastic cushion pad with the transfer board fastener means being mounted by the transfer board such that there are transfer board fastener means oriented outward from both sides of the transfer board for interfitting with the handle means fastener means.

These and other objects and advantages will become apparent from a reading of the following description of the invention and claims.

DETAILED DESCRIPTION OF THE INVENTION

Figure 1:
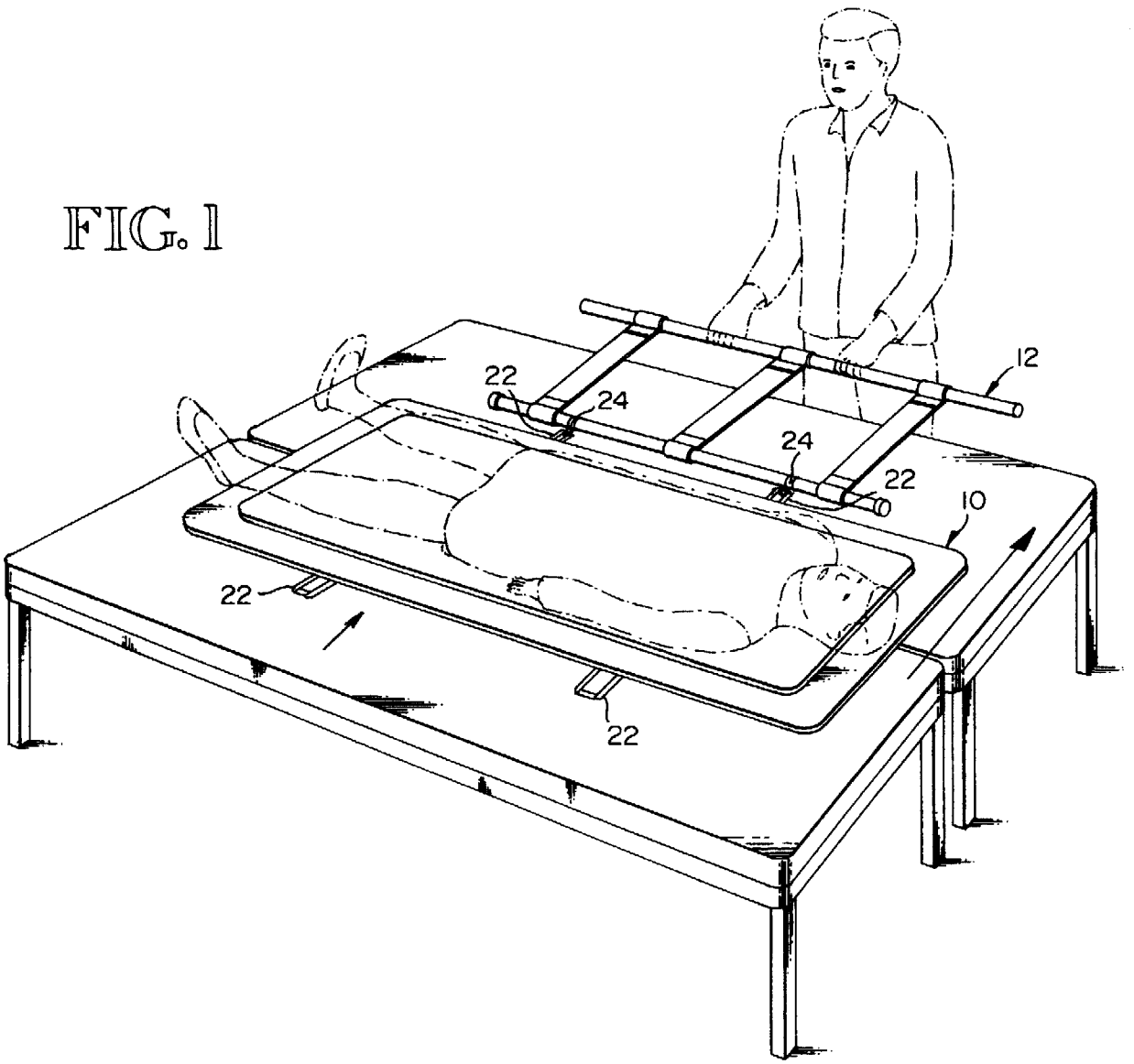
FIG. 1 is a perspective view of the human body transfer device of this invention illustrating its application to transfer a patient from one bed to another.
Figure 2:
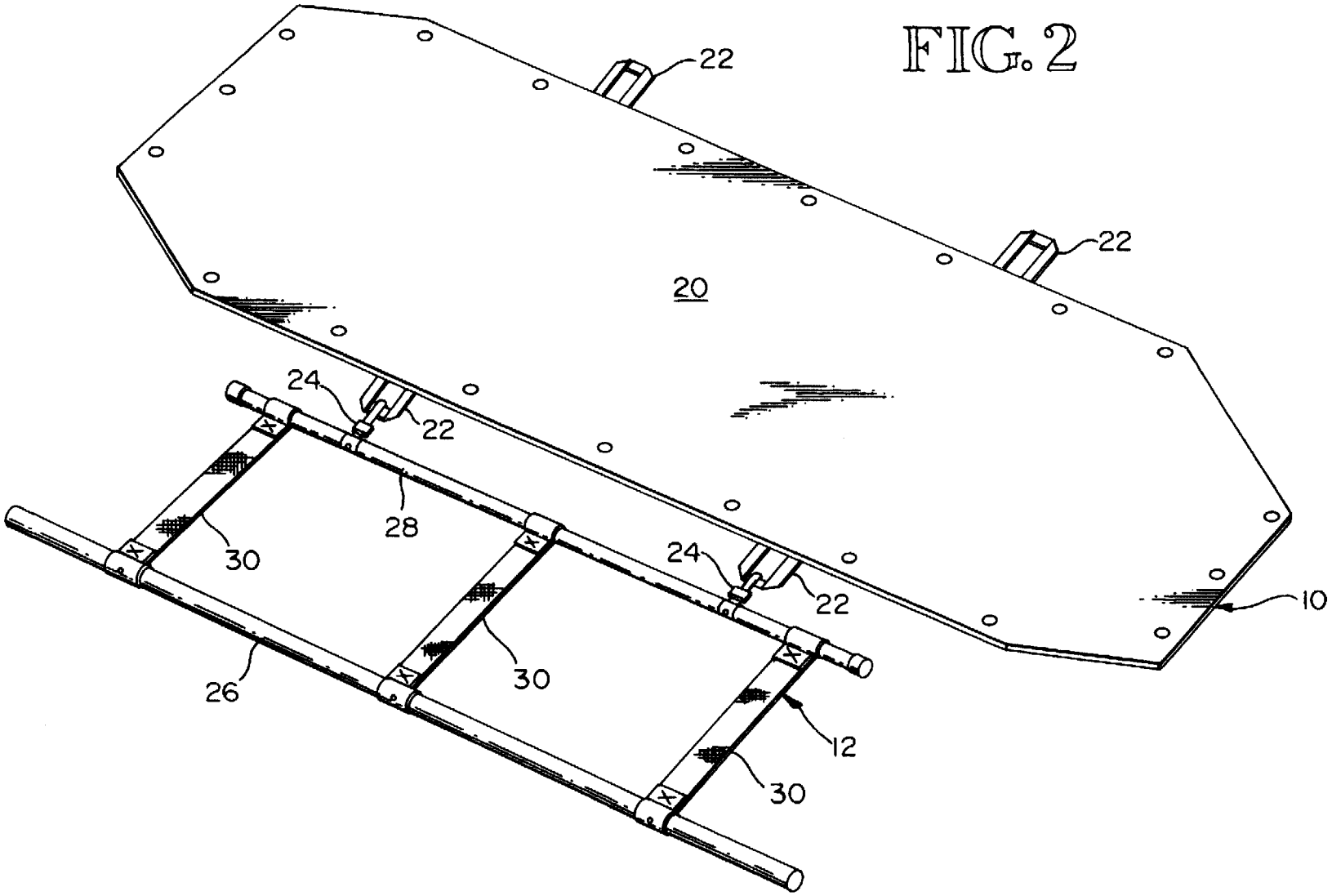
FIG. 2 is a perspective view of the FIG. 1 transfer device.

With reference to FIGS. 1, the transfer device of this invention is illustrated in connection with a worker moving a patient from one bed to another. FIG. 2 illustrates the FIG. 1 transfer device by itself, with no body in position. Hereinafter, the invention is described in connection with its preferred use as a patient transfer device, it being understood that the transfer device is also suitable for use in transferring human bodies, in general, from one surface to another surface, including use in funeral homes and mortuaries.

With reference to FIGS. 1 and 2, the transfer device of this invention comprises a sled means 10 and a handle means 12. The sled means 10 comprises a generally rectangular, relatively thin and flat-surfaced transfer board 20. Transfer board 20 has two parallel sides and two transverse ends. Each side is provided with a plurality of loops 22 which conjoin with fasteners 24 of the handle means. Loops 22 may be spaced equidistantly from the transverse ends along the sides of the transfer board 20 as shown in FIG. 2.

Figure 3:
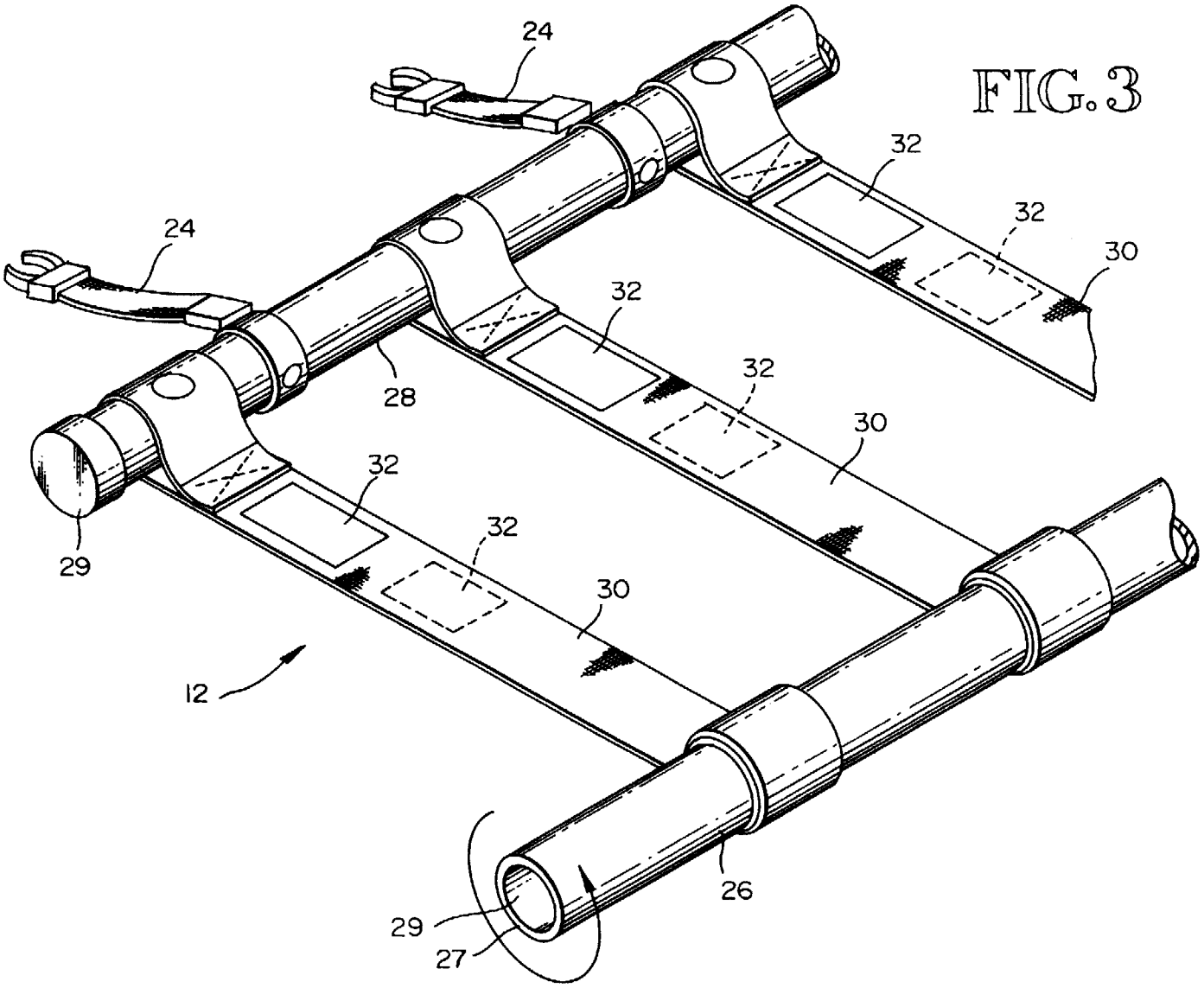
FIG. 3 is another perspective view of the FIG. 1 pulling interface illustrating how the FIG. 1 pulling interface may be rolled up to adjust the length of the pulling interface for optimum leverage by the worker when performing a transfer.

As shown in FIGS. 1–4, handle means 12 comprises a grip bar 26, a tension bar 28, and a plurality of straps 30 which are attached to the grip and tension bars as shown. The ends of the straps 30 are wrapped around the bar 26,28 and looped back on themselves and box stitched thereto as shown in FIG. 3. The looped ends of the straps 30 are also riveted to the bars 26,28 to secure the straps in place and to prevent slippage of the bars within the strap loops. The spacing of the straps 30 is preferably equidistant along the length of the tension bar 28 with the middle strap 30 being centered on the tension bar 28 and the remaining two straps 30 being attached towards the ends of the tension bar 28. Grip bar 26 and tension bar 28 are preferably fabricated from a strong, lightweight, flexible material such as ¾"PVC "Schd. 40" plastic tubing or the like; straps 30 are preferably fabricated from 2" nylon webbing (seat belt material). Fasteners 24 are preferably fabricated from 1" nylon webbing with male and female plastic buckles sewn to the webbing. The 1" webbing of the fasteners 24 is wrapped around the tension bar 28 and looped back onto itself and box stitched. The 1" webbing of the fasteners 24 is riveted to the tension bar 28 to secure the fasteners 24 in place. The mating of fasteners 24 to loops 22 is illustrated in FIG. 5; the male end of the buckle and 1" webbing strap is passed through the loop 22 and then locked into the female end of the buckle forming interlocking loops. The fasteners 24 are preferably fabricated of impact resistant plastic or the like. The material fasteners interfit one within another and releaseably lock together when interfitted. The handle means fasteners 24 are preferably spaced in between the straps 30 and attached to the tension bar 28. The spacing of the straps 30 and the fasteners 24 places opposing force on the tension bar 28 and the spacing of the fasteners 24 is at the proper location for mating with the loops 22 on the transfer board 20 as shown in FIGS. 1 and 2. Grip bar 26 is also preferably encased in a closed cell urethane foam tube 27, or the like, to provide cushioning and improve its gripability. Both bar 26, 28 preferably would be end capped with plastic caps 29, the end caps for the grip bar 26 encasing the end of the plastic tubing and underlaying the foam tube casing 27.

Figure 4:
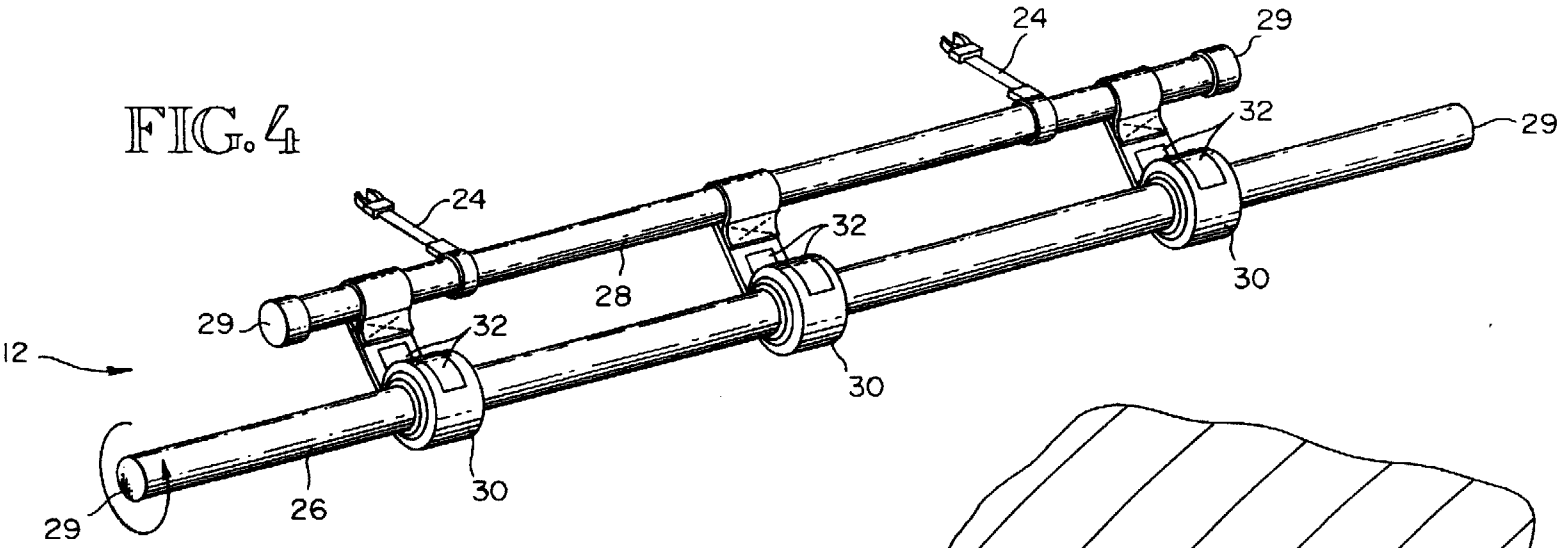
FIG. 4 is a perspective view illustrating how the FIG. 3 pulling interface may be rolled up for stowage or transport.
Figure 5:
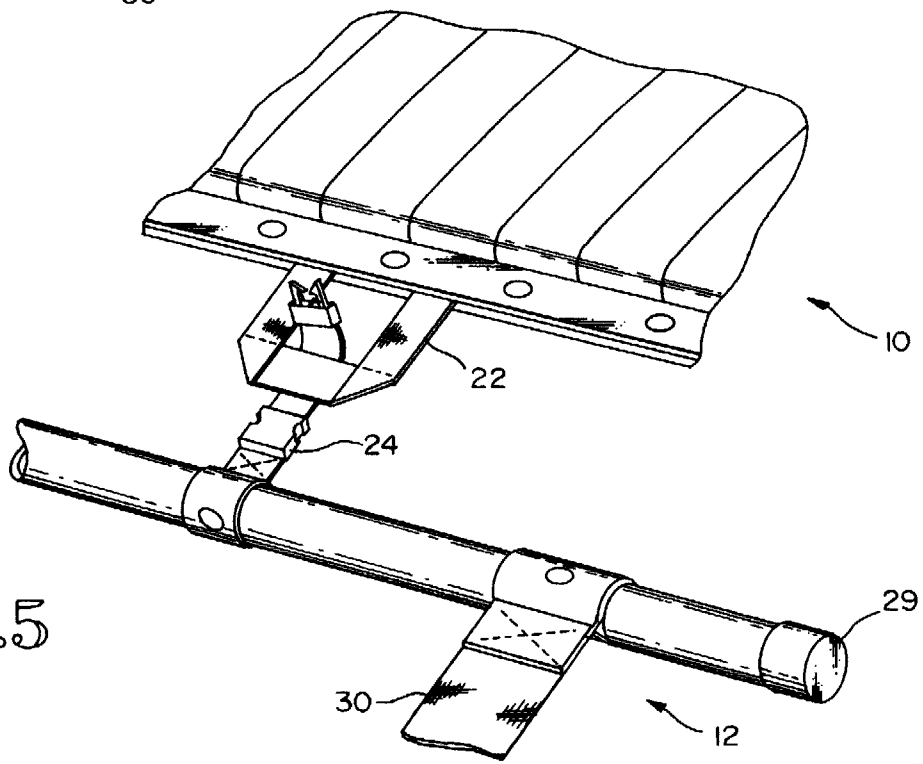
FIG. 5 is an enlarged detail perspective view of the linkage of FIG. 2 pulling interface between a worker and the transfer device sled.

When the handle means 12 is to be stowed, it may be rolled up by rolling the grip bar 26 along the straps 30 until wound up to the tension bar 28, as shown in FIG. 4. Velcro patches 32 sewn onto the top and bottom of straps 30 as shown in FIG. 3 may be used to secure the handle means into position once the handle is rolled up.

Figure 6:
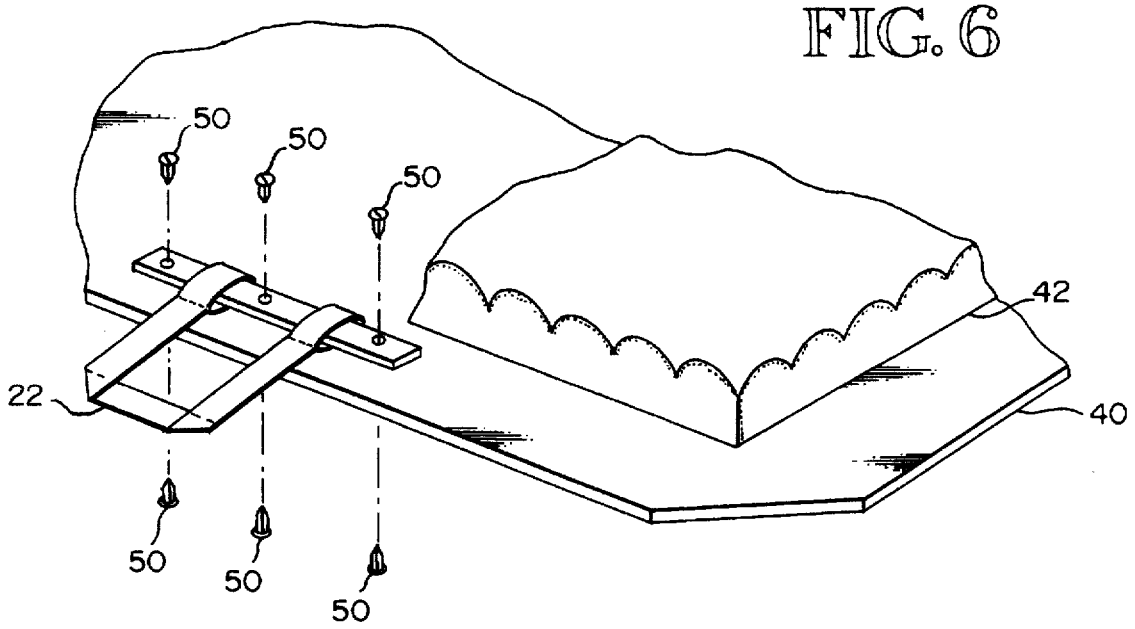
FIG. 6 is a perspective view of the construction of the sled portion of the FIG. 3 sled portion of the pulling interface linkage.
Figure 7:
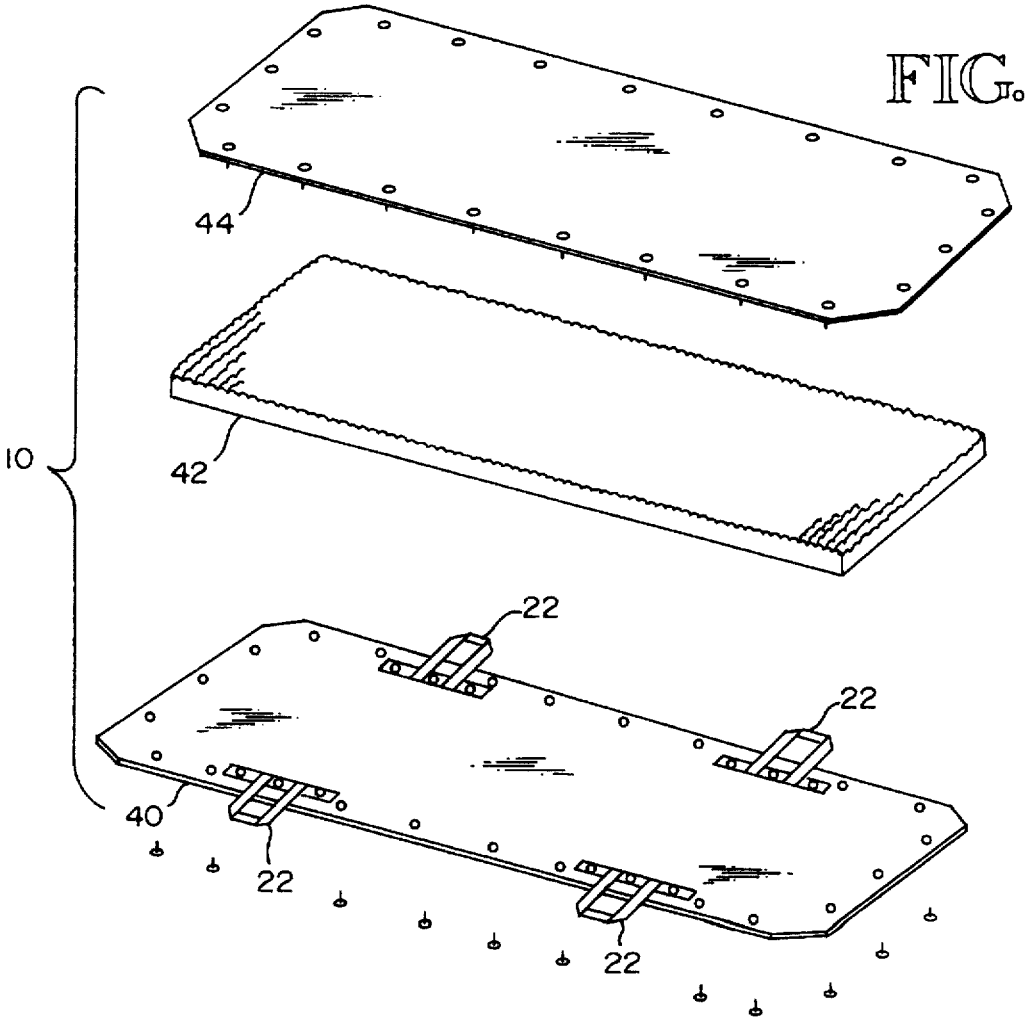
FIG. 7 is an exploded view of the FIG. 1 transfer sled illustrating its construction.
Figure 8:
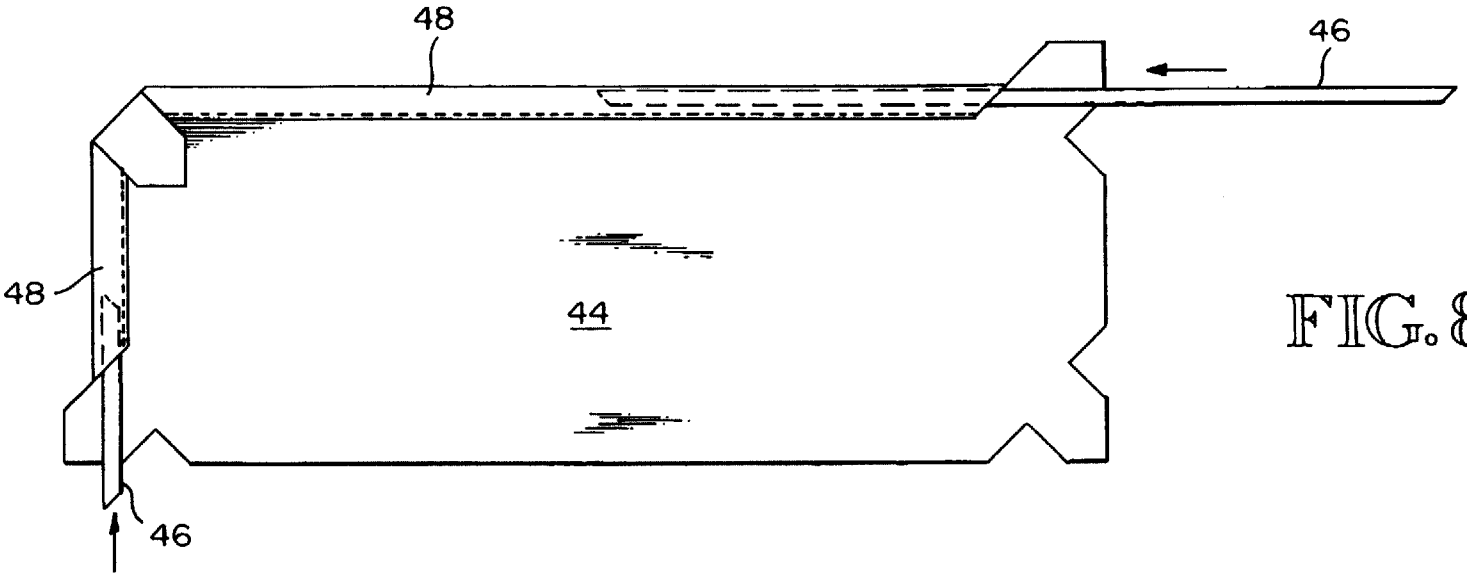
FIG. 8 is a top view of the construction of the sled cover.
Figure 9:
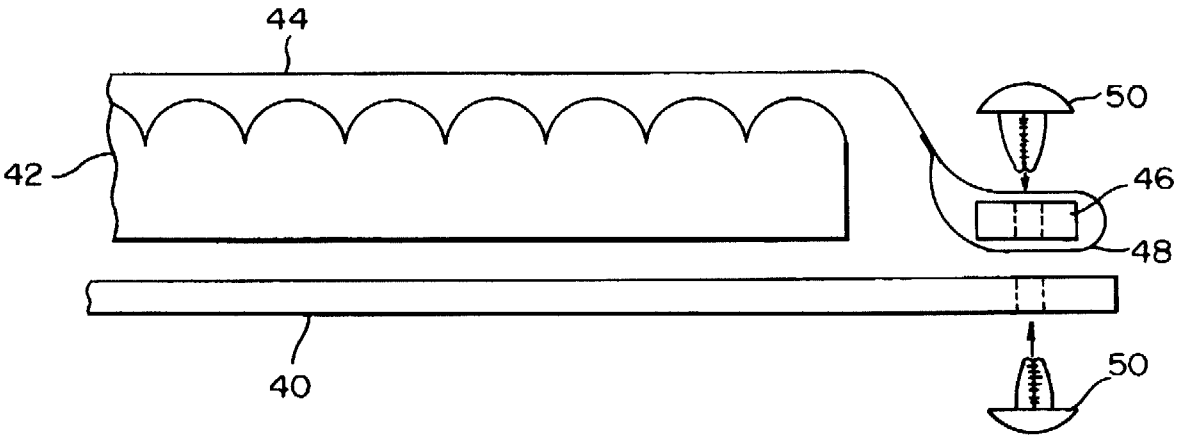
FIG. 9 is a cross-sectional detail of the FIG. 9 cover illustrating its connection to the bottom of the sled.

Sled means 10 preferably comprises a transfer board formed of a bottom sheet 40, an intermediate foam cushion pad 42 and a top cover 44. Bottom sheet 40 is preferably fabricated from a plastic material such as polyethylene or the like; cushion pad 42 is preferably fabricated from an open or closed cell urethane or the like; and top cover 44 is preferably fabricated from a stain and water resistant vinyl fabric or the like. Bottom sheet 40 may have a thickness on the order of ⅛" and the cushion pad 42 may have a thickness on the order of 1–2". The loops 22 are fastened to the bottom 40 at the outer perimeter of the bottom by means of rivets 50 as illustrated in FIG. 6. The cover 44 is preferably fabricated by sewing a tunnel 48 around the perimeter through which 1" wide plastic strips 46 of ⅛" thickness are slid along all sides of the cover 44 as illustrated in FIGS. 8 and 9. Cover 44 is fastened to bottom by plastic or nylon rivets 50 passing through drilled holes in plastic strips 46 and bottom sheet 40; rivets 50 are preferably plastic or nylon.

The handle means of this invention, along with the sled means, changes the way that a worker performs the task of transferring a patient from one surface to another. The handle means enables the worker to pull from a balanced and upright position, thereby keeping the worker's center of gravity within the base of his/her support. The handle means improves the worker's mechanical advantage and leverage over the load. The worker is allowed to perform the task from a position of relative strength as compared to having to forward bend and reach with outstretched arms in order to reach the patient. The position of the grip bar relative to the tension bar is adjustable; the grip bar may be rolled on the straps 30 closer to the tension bar, for example. The adjustable grip bar allows for optimum reach for the individual worker. The flexible grip and tension bars help dissipate the pulling forces from the worker's arms and shoulders. The foam grip on the grip bar protects the hands of the worker. The handle means is designed so that one or more workers may use one or both hands to pull on the grip bar in a synchronized fashion depending on the amount of force needed to move the load. The handle means may be attached to either side of the sled means so that transfers may be made from same side of the bed or other transfer surface without having to rearrange furniture or equipment.

The sled means is designed for safety and comfort. Combined with the handle means, which is removable, it provides a padded and flexible surface for the patient to remain upon during the transfer process, during transport from a patient room for a procedure, and, in many cases, during the procedure/examination itself. The transfer board is flexible and padded for patient comfort during transfer and during extended periods of lying on the transfer board. The bottom of the transfer board is preferably fabricated of anti-static material to eliminate painful and possibly dangerous micro-electricity discharges. The transfer board is preferably of non-metallic construction, including the rivets, and is X-ray proof.

While the preferred embodiment of the invention has been described herein, variations in the design may be made. The scope of the invention, therefore, is only limited by the claims appended hereto.

The embodiments of the invention in which an exclusive property is claimed are defined as follows:

1. A transfer device for a human body comprising sled means and detachable handle means wherein:

said sled means comprising a transfer board adapted to receive a human body, said transfer board having two sides and two transverse ends, and a plurality of loop means mounted to said transfer board along the sides thereof;

and said handle means comprising an elongated grip bar, and an elongated tension bar, a plurality of strap means connecting said grip bar and said tension bar whereby the relative distance between said grip bar and said tension bar may be adjusted, and a plurality of fastener means mounted to said tension bar and so constructed and arranged as to be conjoinable with the transfer board loop means on either side of the said transfer board.

2. The transfer device of claim 1 wherein said grip bar and said tension bar are fabricated of a relatively flexible material whereby pulling force exerted by the worker will be dissipated from the worker's arms and shoulders.

3. The transfer device of claim 1 wherein said strap means are wrapped around said grip bar and said tension bar and fastened thereto, and wherein the handle means fasteners means are mounted and oriented outward from said handle means for interlooping with said transfer board loop means.

4. The transfer device of claim 1 wherein said transfer board comprises a bottom surface material fabricated of a sheet of plastic, a foam plastic cushion pad, and a plurality of loops mounted and secured on the sides of the bottom sheet; said transfer board loop means being mounted such that they are oriented outward on both sides of said transfer board for interfitting with said handle means fastener means.

5. A transfer device for a human body comprising sled means and detachable handle means wherein:

said sled means comprising a transfer board adapted to receive a human body, said transfer board having two sides and two transverse ends, and a plurality of fastener means mounted to said transfer board along the sides thereof;

and said handle means comprising an elongated grip bar, and an elongated tension bar, a plurality of strap means connecting said grip bar and said tension bar whereby the relative distance between said grip bar and said tension bar may be adjusted, and a plurality of fastener means mounted to said tension bar and so constructed and arranged as to be conjoinable with the transfer board fastener means on at least one side of said transfer board.

6. The transfer device of claim 5 wherein said grip bar is fabricated of a relatively flexible material whereby pulling force exerted by a worker using the transfer device will be dissipated from the worker's arm and shoulders.

7. The transfer device of claim 5 wherein said strap means are wrapped around said grip bar and said tension bar and fastened thereto, and wherein the handle means fasteners means are mounted by said strap means and oriented outward from said handle means for interfitting with said transfer board fastener means.

8. The transfer device of claims 5 wherein said transfer board comprises a bottom surface material fabricated of a sheet of plastic, and a foam plastic cushion pad; said transfer board fastener means being mounted by the transfer board such that there are transfer board fastener means oriented outward from both sides of said transfer board for interfitting with said handle means fastener means.

9. A transfer device for a human body comprising sled means and detachable handle means wherein:

said sled means comprising a transfer board adapted to receive a human body, said transfer board having two sides and two transverse ends, and a plurality of fastener means mounted to said transfer board along the sides thereof;

and said handle means comprising an elongated grip bar, and an elongated tension bar, a plurality of strap means connecting said grip bar and said tension bar whereby the relative distance between said grip bar and said tension bar may be adjusted, and a plurality of fastener means mounted to said tension bar and so constructed and arranged as to be conjoinable with the transfer board fastener means on either side of said transfer board; said grip bar being fabricated of a relatively flexible material and said tension bar being fabricated of a relatively flexible material whereby pulling force exerted by a worker using the transfer device will be dissipated from the worker's arm and shoulders.

10. The transfer device of claim 9 wherein said strap means are wrapped around said grip bar and said tension bar and fastened thereto, and wherein the handle means fasteners means are mounted by said strap means and oriented outward from said handle means for interfitting with said transfer board fastener means.

11. The transfer device of claims 9 wherein said transfer board comprises a bottom surface material fabricated of a sheet of plastic, and a foam plastic cushion pad; said transfer board fastener means being mounted by the transfer board such that there are transfer board fastener means oriented outward from both sides of said transfer board for interfitting with said handle means fastener means.

*12. A transfer device for a human body comprising sled means and detachable handle means wherein:*

*said sled means comprising a transfer board adapted to receive a human body, said transfer board having two sides and two transverse ends;*

*and said handle means comprising an elongated grip bar, and a plurality of strap means connecting said grip bar and said sled means whereby the relative distance between said grip bar and said sled means may be adjusted, and fastener means for joining said handle means to said sled means.*

*13. The transfer device of claim 12 wherein said grip bar is fabricated of a relatively flexible material whereby pulling force exerted by the worker will be dissipated from the worker's arms and shoulders.*

*14. The transfer device of claim 12 wherein said strap means are wrapped around said grip bar and fastened thereto, and wherein the handle means fastener means are mounted and oriented outward from said handle means for connection with said transfer board.*

*15. The transfer device of claim 12 wherein said transfer board comprises a bottom surface material fabricated of a sheet of plastic, a foam plastic cushion pad, and a plurality of loops mounted and secured on the sides of the bottom sheet; said transfer board loops being mounted such that they are oriented outward on both sides of said transfer board for interfitting with said handle means fastener means.*

* * * * *